US010807231B2

(12) United States Patent
 Morimura

(10) Patent No.: US 10,807,231 B2
(45) Date of Patent: Oct. 20, 2020

(54) MACHINE TOOL

(71) Applicant: OKUMA Corporation, Niwa-gun, Aichi (JP)

(72) Inventor: Shoichi Morimura, Aichi (JP)

(73) Assignee: OKUMA CORPORATION, Niwa-Gun, Aichi (JP)

( * ) Notice: Subject to any disclaimer, the term of this patent is extended or adjusted under 35 U.S.C. 154(b) by 387 days.

(21) Appl. No.: 15/907,726

(22) Filed: Feb. 28, 2018

(65) Prior Publication Data
 US 2018/0250809 A1 Sep. 6, 2018

(30) Foreign Application Priority Data

Mar. 2, 2017 (JP) ................... 2017-039501

(51) Int. Cl.
 *B23Q 7/04* (2006.01)
 *B25J 9/00* (2006.01)
 *B25J 11/00* (2006.01)
 *B25J 17/00* (2006.01)

(52) U.S. Cl.
 CPC .............. *B25J 9/0009* (2013.01); *B23Q 7/04* (2013.01); *B25J 11/0055* (2013.01); *B25J 17/00* (2013.01); *B23Q 2707/003* (2013.01); *Y10S 901/28* (2013.01); *Y10S 901/30* (2013.01)

(58) Field of Classification Search
 CPC ........ B23Q 2003/155411; B23Q 1/706; B23B 13/12; B23B 3/065
 See application file for complete search history.

(56) References Cited

U.S. PATENT DOCUMENTS

| 3,779,110 | A | * | 12/1973 | Harman | ................. | B23B 31/36 483/20 |
| 4,097,175 | A | * | 6/1978 | Tsukiji | .................... | B23B 3/065 29/26 R |
| RE31,304 | E | * | 7/1983 | Tsukiji | .................... | B23B 3/065 29/27 C |
| 4,589,818 | A | * | 5/1986 | Brown | ..................... | B23Q 7/04 414/4 |
| 4,716,647 | A | * | 1/1988 | Winkler | ................ | B23Q 7/043 483/14 |
| 5,007,151 | A | * | 4/1991 | Gusching | ................ | B23B 3/161 29/27 C |
| 5,074,741 | A | * | 12/1991 | Johansson | .......... | B23K 37/0426 414/736 |

(Continued)

FOREIGN PATENT DOCUMENTS

| JP | S58192703 A | 11/1983 |
| JP | 2010064158 A | 3/2010 |

OTHER PUBLICATIONS

JPO Notice of Grounds for Rejection for corresponding JP Patent Application No. 2017-039501, dated May 12, 2020.

*Primary Examiner* — Howard J Sanders
*Assistant Examiner* — Gregory T Prather
(74) *Attorney, Agent, or Firm* — Cantor Colburn LLP

(57) ABSTRACT

A machine tool includes a workpiece spindle that retains a workpiece or a tool, a spindle motor that rotates the workpiece spindle, an in-machine robot that is provided inside the machine tool and that is an articulated robot having one or more joints, and a plurality of gears that connect or disconnect a root joint which is placed, among the one or more joints, closest to a base end, and the spindle motor to or from each other.

7 Claims, 5 Drawing Sheets

(56) References Cited

U.S. PATENT DOCUMENTS

| | | | | |
|---|---|---|---|---|
| 5,117,544 A | * | 6/1992 | Kousaku | B23B 3/06 29/27 C |
| 5,727,297 A | * | 3/1998 | Sahm | B23B 29/323 29/40 |
| 5,730,691 A | * | 3/1998 | Tokura | B23Q 1/0018 483/56 |
| 5,745,967 A | * | 5/1998 | Kojima | B23Q 5/048 29/40 |
| 5,842,392 A | * | 12/1998 | Pfeifer | B23B 3/168 82/1.11 |
| 6,785,943 B2 | * | 9/2004 | Sheehan | B23Q 16/102 29/40 |
| 2010/0061830 A1 | | 3/2010 | Kitayama et al. | |
| 2011/0182687 A1 | * | 7/2011 | Munz | B23Q 7/045 409/225 |
| 2014/0165907 A1 | * | 6/2014 | Furuya | B23Q 7/04 118/500 |
| 2018/0207804 A1 | * | 7/2018 | Itou | B25J 9/1005 |
| 2018/0272487 A1 | * | 9/2018 | Watanabe | B25J 11/005 |
| 2018/0272530 A1 | * | 9/2018 | Watanabe | B25J 11/006 |
| 2020/0108503 A1 | * | 4/2020 | Yoshino | B25J 13/087 |
| 2020/0114482 A1 | * | 4/2020 | Hayashi | B23B 29/24 |

* cited by examiner

MACHINE TOOL

CROSS REFERENCE TO RELATED APPLICATION

The present application claims priority under 35 U.S.C. § 119 to Japanese Application No. 2017-039501 filed Mar. 2, 2017, the entire content of which is incorporated herein by reference.

TECHNICAL FIELD

The present disclosure relates to a machine tool which cuts and machines a workpiece.

BACKGROUND

Recently, demands are increasing for automation and higher performances of machine tools. In order to realize automation, automatic changer apparatuses are proposed such as an automatic tool changer (ATC) which automatically changes tools, and an automatic palette changer (APC) which automatically changes a palette on which a workpiece is mounted. In addition, peripheral apparatuses such as a workpiece supply apparatus such as a loader and a bar feeder are also widely known. In order to realize higher performance, in-machine measurement and intelligent system using sensors are also employed.

Further, in order to automate or improve performance of machine tools, in some cases, use of an articulated robot is proposed. For example, JP 2010-64158 A discloses a technique in which an articulated robot which travels on a gantry rail attached outside of and on an upper part of the machine tool is provided, and the transport of the workpiece or the like among a plurality of machine tools is executed by the articulated robot.

The articulated robot normally has one or more joints. The articulated robot changes its position and orientation by rotating or linearly moving (translating) the joints. Therefore, when an articulated robot is provided, an actuator for actuating the joints must be provided.

Of the one or more joints of the articulated robot, at a root joint which is positioned closest to a base end, receives the largest load (moment). Thus, it is desired that the actuator which actuates the root joint has a sufficiently large power to resist the large load. In particular, when the articulated robot is used to handle a heavyweight object such as, for example, a workpiece or a large-size sensor, the power of the actuator for the root joint must be set large.

However, when the power of the actuator for the root joint is set large, problems are created, such as increases in the size and cost of the actuator. In particular, when the articulated robot is to be stored completely inside the machine tool, because there is only a limited placement space, the increase in the size of the actuator, and consequently, that of the articulated robot, poses a serious problem.

The present disclosure thus discloses a machine tool having an in-machine robot which has a small size, and also a large power.

SUMMARY

According to one aspect of the present disclosure, there is provided a machine tool comprising: a retaining member that retains a workpiece or a tool; a first motor that rotates or moves the retaining member; an in-machine robot that is provided inside the machine tool and that is an articulated robot having one or more joints; and a connection mechanism that connects or disconnects a root joint which is placed, among the one or more joints, closest to a base end, and the first motor to or from each other.

According to another aspect of the present disclosure, the machine tool may further comprise a root joint actuator that is provided separately from the first motor and that actuates the root joint.

According to another aspect of the present disclosure, during a period in which the root joint and the first motor are connected to each other, the root joint actuator may be set in a free state or may be disconnected from the root joint.

According to another aspect of the present disclosure, the root joint is a rotary joint that rotates, and the retaining member may rotate with actuation of the first motor.

According to another aspect of the present disclosure, a rotational axis of the retaining member and a rotational axis of the root joint may be non-coincident with each other, and the root joint may be connected to or disconnected from the first motor via a plurality of transmission mechanisms.

According to another aspect of the present disclosure, a rotational axis of the retaining member and a rotational axis of the root joint may be coincident with each other, an engagement element may be provided on one of the root joint and the retaining member, and an engaged element that engages or disengages in a circumferential direction with or from the engagement element may be provided on the other of the root joint and the retaining member.

According to another aspect of the present disclosure, the retaining member may be a workpiece spindle which retains a workpiece in a self-rotatable manner.

According to a machine tool disclosed in the present disclosure, the root joint can use a motive power of the first motor for rotating or moving the retaining member as necessary. Because of this, it is possible to set a large power for the root joint while reducing the size of the actuator which actuates the root joint. As a result, there can be obtained a machine tool having an in-machine robot with a large power and also a small size.

BRIEF DESCRIPTION OF DRAWINGS

Embodiment(s) of the present disclosure will be described by reference to the following figures, wherein.

DESCRIPTION OF EMBODIMENTS

Figure 1:
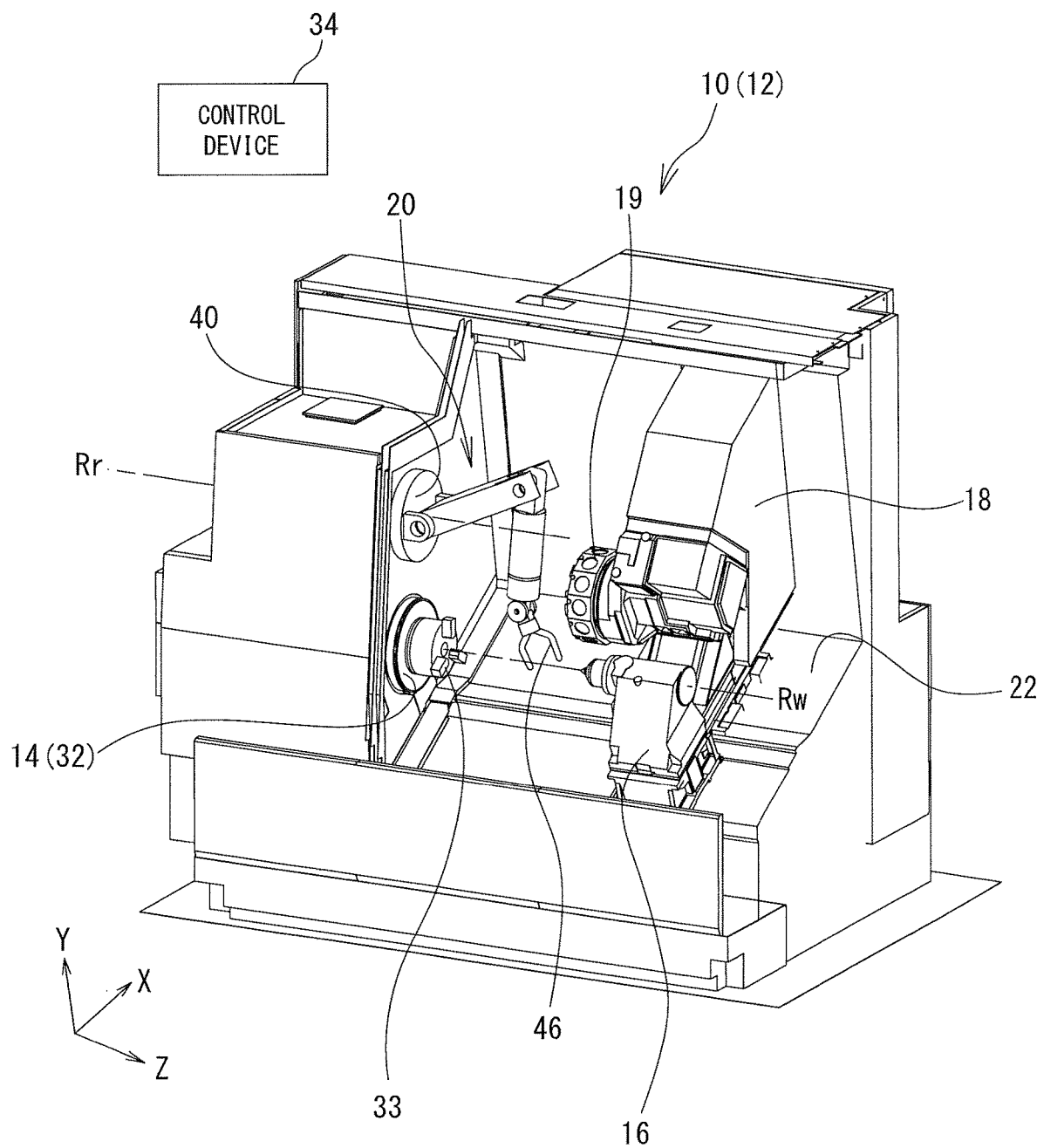
FIG. 1 is a perspective diagram of a machine tool.

A structure of a machine tool 10 will now be described with reference to the drawings. FIG. 1 is a diagram schematically showing a structure of the machine tool 10. In the following description, a rotational axis direction of a workpiece spindle 32 will be referred to as a Z-axis, a movement direction of a tool post 18 orthogonal to the Z-axis will be referred to as an X-axis, and a direction orthogonal to the X-axis and the Z-axis will be referred to as a Y-axis. In addition, in the Z-axis, a direction from the workpiece spindle 32 toward a tailstock 16 is set as a positive direction, in the X-axis, a direction from the workpiece spindle 32 toward the tool post 18 is set as a positive direction, and in the Y-axis, a direction from the workpiece spindle 32 toward the upward direction is set as a positive direction.

The machine tool 10 is a lathe which machines a workpiece by bringing a tool retained by the tool post 18 into contact with a self-rotating workpiece. The machine tool 10 is a lathe which is called a turning center which is NC controlled and which retains a plurality of tools. A periphery of a body 12 of the machine tool 10 is covered by a cover (not shown). A space defined by the cover is a machining chamber in which the machining of the workpiece is executed. On the cover, at least one opening and a door for opening or closing the opening (both of which are not shown) are provided. An operator accesses the body 12 of the machine tool 10, the workpiece, or the like through the opening. During the machining, the door provided on the opening is closed. This is for the sake of safety and the surrounding environment.

The body 12 comprises a workpiece spindle device 14 which retains one end of the workpiece in a self-rotatable manner, the tool post 18 which retains the tool, the tailstock 16 which supports the other end of the workpiece, and an in-machine robot 20. The workpiece spindle device 14 comprises the workpiece spindle 32 which is connected to a spindle motor (which is not shown in FIG. 1). The workpiece spindle 32 functions as a retaining member which retains the workpiece in a rotatable manner. The workpiece spindle 32 self-rotates around a rotational axis Rw which is parallel to the Z-axis, with the actuation of the spindle motor. At a tip of the workpiece spindle 32, a chuck 33 or a collet which detachably retains the workpiece is provided, and the workpiece can be suitably exchanged.

Near the workpiece spindle device 14, the in-machine robot 20 is attached. The in-machine robot 20 is used for helping the machining, various sensing operations, auxiliary works, or the like. A structure and a function of the in-machine robot 20 will be described later in detail.

The tailstock 16 is placed opposing the workpiece spindle device 14 in the Z-axis direction, and supports the other end of the workpiece which is retained by the workpiece spindle device 14. The tailstock 16 is placed at a position in which the central axis thereof coincides with the workpiece rotational axis Rw. A center having a tip sharpened in a conical shape is attached to the tailstock 16, and, during the machining, the tip of the center is caused to contact a central point of the workpiece. The tailstock 16 is movable in the Z-axis direction so that the tailstock 16 can move toward or away from the workpiece.

The tool post 18 retains a tool such as, for example, a tool called a bite. The tool post 18 is movable in the Z-axis direction. In addition, the tool post 18 is mounted on a guiderail extending in the X-axis direction, and can move back and forth along the X-axis direction. At a tip of the tool post 18, a turret 19 which can retain a plurality of tools is provided. The turret 19 is rotatable around an axis extending in the Z-axis direction. With the rotation of the turret 19, a tool to be used for the machining of the workpiece can be suitably changed. With a movement of the tool post 18 in the Z-axis direction, a tool retained on the turret 19 is moved in the Z-axis direction. In addition, with a movement of the tool post 18 in the X-axis direction, the tool retained on the turret 19 is moved in the X-axis direction. Further, with the movement of the tool post 18 in the X-axis direction, an amount of cutting of the workpiece by the tool or the like can be changed.

A control device 34 controls actuation of various parts of the machine tool 10 according to a command from an operator. The control device 34 comprises, for example, a CPU which executes various calculations, and a memory which stores various control programs and control parameters. The control device 34 also has a communication function, and can exchange various data, for example, the NC program data or the like, with the other devices. The control device 34 may include, for example, a numerical control device which calculates the positions of the tool and the workpiece at all times. The control device 34 may be a single device, or a combination of a plurality of calculation devices.

Next, the in-machine robot 20 will be described in detail. The in-machine robot 20 is an articulated robot provided inside the machine tool 10; more specifically, in the machining chamber. The in-machine robot 20 comprises a plurality of arms, a plurality of joints, and an end effector 46. The plurality (in the configuration exemplified in the drawings, 3) of arms of the in-machine robot 20 are connected to each other via the joints. To each joint, an actuator having a motor or the like is attached, and each joint rotates or linearly moves by actuation of the actuator. The actuation of the actuator is controlled by the control device 34. The control device 34 calculates a position of the end effector 46 to be described later, from an amount of actuation of the actuator provided at each joint. Of the plurality of joints, a root joint 40 positioned closest to the base end is a rotary joint which self-rotates around a rotational axis Rr which is parallel to the rotational axis Rw of the workpiece spindle 32.

The end effector 46 is provided at the tip of the in-machine robot 20. The end effector 46 is not particularly limited so long as the end effector 46 is an element which acts on a target. Therefore, the end effector 46 may be, for example, a retaining mechanism which retains a target. The form of retention may be a hand form in which the target is pinched and held with a pair of members, a form in which the target is suctioned and retained, or a form in which the target is retained using magnetic force or the like. FIG. 1 exemplifies the end effector 46 of the hand form. As another form, the end effector 46 may be a pressing mechanism which presses the target. For example, the end effector 46 may be a roller or the like which is pressed against the workpiece and suppresses vibration of the workpiece.

As another form, the end effector 46 may be, for example, a contact sensor which detects presence or absence of contact with the target; a distance sensor which detects a distance to the target; a vibration sensor which detects vibration of the target; a pressure sensor which detects a pressure applied from the target; a temperature sensor which detects a temperature of the target; or the like. Detection results of these sensors are stored in association with position information of the end effector 46 calculated from the amount of actuation of the joints, and analyzed. For example, when the end effector 46 is the contact sensor, the control device 34 analyzes a position, a shape, and a motion of the target, based on a timing when the contact with the target is detected, and the position information at that timing.

Alternatively, as another form, the end effector 46 may be a device which outputs fluid for helping the machining. More specifically, the end effector 46 may be a device which discharges air for blowing swarf, or discharges cooling fluid (cutting oil, cutting water, or the like) for cooling the tool or the workpiece. Further, the end effector 46 may be a device which discharges energy or a material for workpiece formation. Therefore, the end effector 46 may be, for example, a device which discharges laser or arc, or a device which discharges a material for layering and formation. Alternatively, as another form, the end effector 46 may be a camera which images the target. In this case, a video image obtained by the camera may be displayed on an operation panel or the like.

The target onto which the end effector 46 acts is not particularly limited, so long as the target is an object in the machining chamber. Therefore, the target may be the workpiece retained on the workpiece spindle device 14, or the tool retained on the tool post 18. Further, the target may be other than the tool and the workpiece, for example, the swarf spread in the machining chamber, a component assembled to the workpiece, or a constituting component of the machine tool 10 (for example, the chuck 33 of the workpiece spindle device 14).

The end effector 46 may be set exchangeable as suited. For example, a plurality of types of end effectors 46 may be prepared inside or outside of the machining chamber, and the end effector 46 to be attached to the in-machine robot 20 can be set changeable according to the usage.

Next, the actuation of the in-machine robot 20, in particular, actuation of the root joint 40, will be described. As already described, the in-machine robot 20 can change its orientation by suitably moving the plurality of joints. In this process, a large moment is applied to a base end side of the in-machine robot 20; that is, on the root joint 40. In particular, when the arm of the in-machine robot 20 is elongated into a lengthy form, or when a heavy object is provided on the tip of the in-machine robot 20, the load on the root joint 40 becomes high. Here, when a retaining mechanism is provided as the end effector 46, the workpiece retained on the retaining mechanism corresponds to such a heavy object. In some cases, the end effector 46 itself may be the heavy object such as, for example, in the case that the end effector 46 is a heavyweight tool or the like.

In either case, when the load on the root joint 40 becomes large, a torque for actuating the root joint 40 must also be increased. However, when the power of the actuator which actuates the root joint 40 is to set large, the size and cost would also be significantly increased. On the other hand, the spindle motor which rotationally actuates the workpiece spindle 32 has a very large power, but in general, the spindle motor is only actuated during machining of the workpiece, and is only slightly actuated during the period in which the workpiece is not machined. Thus, in the machine tool disclosed in the present disclosure, the spindle motor which rotates the workpiece spindle 32 is connected to or disconnected from the root joint 40 as necessary.

Figure 2:
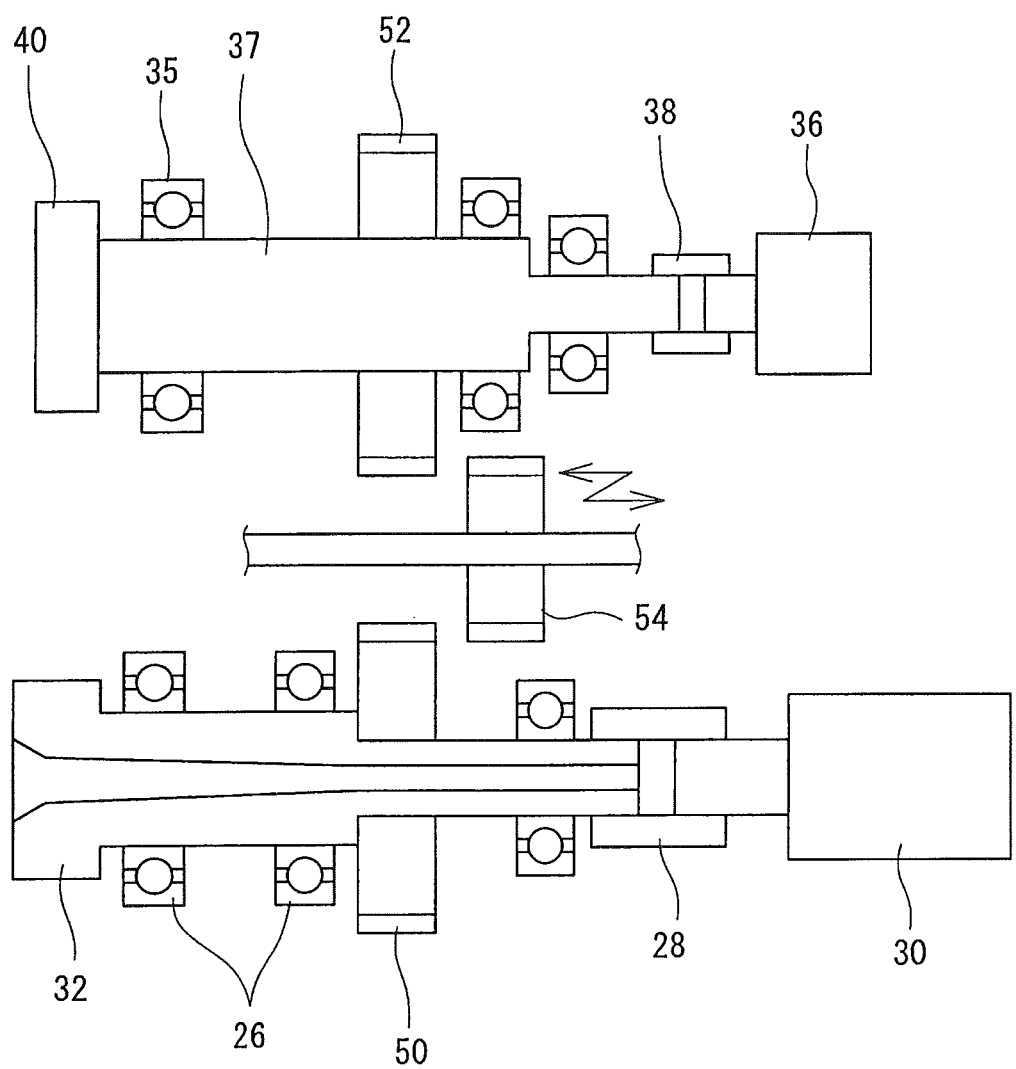
FIG. 2 is a schematic diagram showing actuation mechanisms of a workpiece spindle and a root joint.

This configuration will now be described with reference to FIG. 2. FIG. 2 is a schematic diagram of actuation mechanisms of the workpiece spindle 32 and the root mechanism 40. The workpiece spindle 32 is pivotably supported in a rotatable manner by a plurality of bearings 26. A base end of the workpiece spindle 32 is connected to a large-power spindle motor 30 via a coupling 28, and, with rotation of the spindle motor 30, the workpiece spindle 32 is rotated. Therefore, the spindle motor 30 functions as a first motor which rotates the workpiece spindle 32, and, consequently, the workpiece retained by the workpiece spindle 32. Here, the spindle motor 30 and the workpiece spindle 32 are directly connected, but alternatively, a reduction gear may be interposed as necessary.

A root joint actuator for actuating the root joint 40 is connected to the root joint 40. Various structures may be considered as the structure of the root joint actuator. In the configuration exemplified in the drawing, the actuator comprises a transmission shaft 37, and a root joint motor 36 which is connected to the transmission shaft 37 via a coupling 38. The transmission shaft 37 is fixed to the root joint 40, and integrally rotates with the root joint 40. The transmission shaft 37 is also pivotably supported by a plurality of bearings 35. A base end of the transmission shaft 37 is connected to the root joint motor 36 via the coupling 38, and, with rotation of the root joint motor 36, the transmission shaft 37 also rotates. Alternatively, a reduction gear or the like may be interposed between the root joint motor 36 and the transmission shaft 37.

As is clear from FIG. 2, at an outer circumference of the workpiece spindle 32, a first gear 50 is fixed, and, at an outer circumference of the transmission shaft 37, a second gear 52 is fixed. Between the first gear 50 and the second gear 52, a connection gear 54 which meshes with both gears is provided. The connection gear 54 can be moved back and forth in a direction parallel to the workpiece spindle 32, and, with the movement, the connection gear 54 is meshed with the first and second gears 50 and 52 or the meshing with the first and second gears 50 and 52 is released. In a connection state in which the connection gear 54 is meshed with the first and second gears 50 and 52, the root joint 40 is connected to the spindle motor 30 via the transmission shaft 37, the second gear 52, the connection gear 54, the first gear 50, the workpiece spindle 32, and the coupling 28. In this case, the root joint 40 is rotationally actuated with the actuation of the spindle motor 30. When the root joint 40 is actuated using the spindle motor 30, the root joint motor 36 may be set in a free state where no torque is applied, or may be synchronously controlled to move synchronously with the spindle motor 30. Further, the numbers of teeth of the first gear 50 and the second gear 52 may be set different, to apply gear reduction or gear acceleration. Alternatively, two or more pairs of the gears may be provided, to allow a change of the gear reduction ratio. The connection mechanism described herein is merely exemplary, and other structures such as, for example, a clutch mechanism or the like, may be used, so long as the structure can connect or disconnect the root joint 40 and the spindle motor 30 as necessary.

In the root joint 40 having such a structure, when a large torque is not necessary, the connection with the spindle motor 30 is released, and the root joint 40 is actuated by the root joint motor 36. On the other hand, when a large torque is necessary, the root joint 40 is connected to the spindle motor 30, and is actuated with the large-power spindle motor 30, in place of or in addition to the root joint motor 36. In other words, a motive force source of the root joint 40 is switched according to the necessary torque.

Various situations can be considered as the situation requiring a large torque. For example, cases may be considered in which the workpiece is attached or detached using the in-machine robot 20. Specifically, when the retaining mechanism which can retain the workpiece is provided as the end effector 46 of the in-machine robot 20, the workpiece can be transported by the in-machine robot 20. In transporting the workpiece which is a heavy object, a large torque is necessary for the root joint 40. In this case, it is desirable to connect the root joint 40 to the large-power spindle motor 30. Specifics of this process will now be described with reference to FIG. 3.

Figure 3:
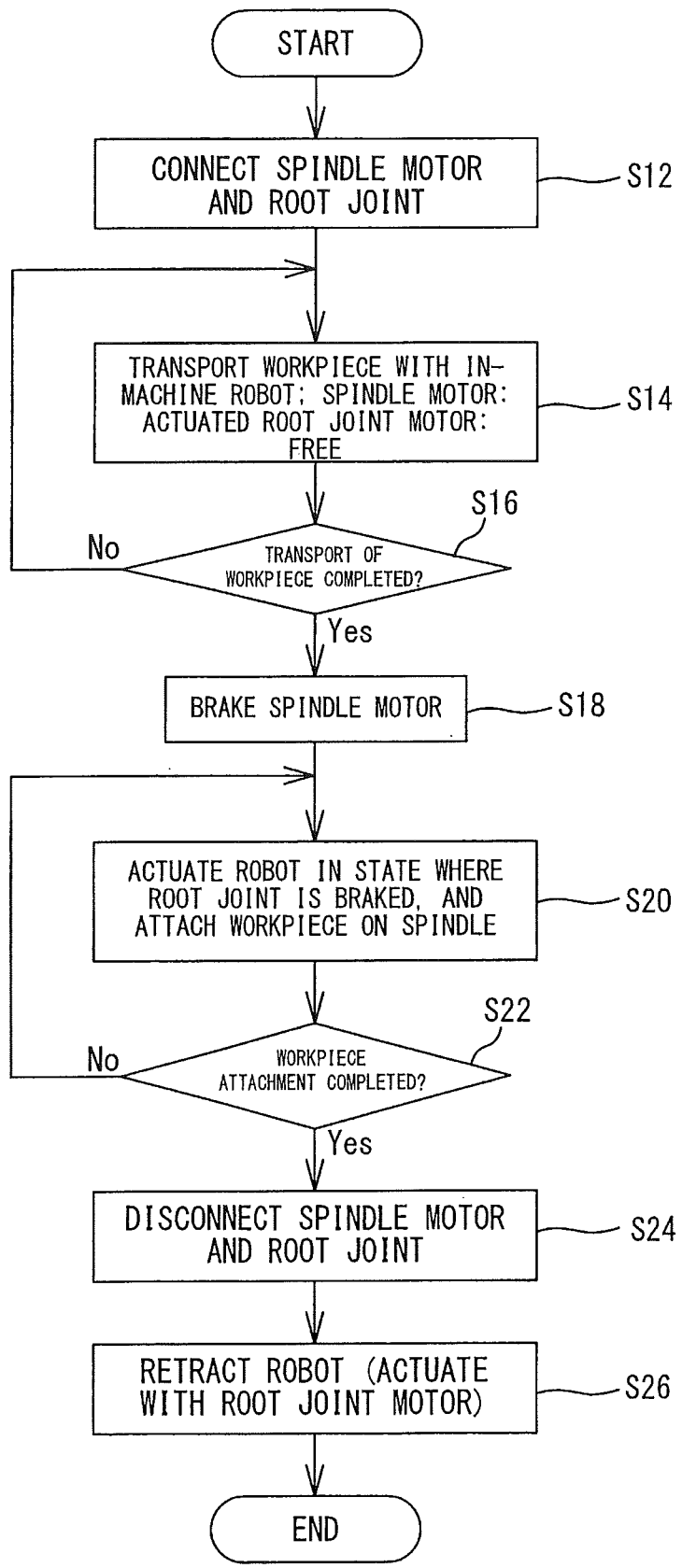
FIG. 3 is a flowchart showing a flow of attachment of a workpiece.

FIG. 3 is a flowchart showing a flow of a process of attaching the workpiece on the chuck 33 of the workpiece spindle device 14 using the in-machine robot 20. When the workpiece is to be attached to the chuck 33 using the in-machine robot 20, first, the spindle motor 30 and the root joint 40 are connected (S12). Specifically, the connection gear 54 is moved, to mesh with the first gear 50 and the second gear 52.

Next, the joints of the in-machine robot 20 are actuated, to pick up the workpiece placed outside of the machining chamber or the like, and the workpiece retained by the end effector 46 is transported to a region proximate the chuck 33 (S14). In this process, the root joint motor 36 is set free, and the root joint 40 is actuated with the spindle motor 30. With such a configuration, it is not necessary to synchronously actuate the root joint motor 36 and the spindle motor 30, resulting in simplification of the control. Further, when the workpiece is transported, a large load is applied to the root joint 40, but by actuating the root joint 40 with the spindle motor 30, a large torque can be obtained.

When the workpiece is transported to the region proximate the chuck 33 (Yes in S16), the spindle motor 30 is braked in order to restrict rotation of the root joint 40 and the chuck 33 (and consequently, the workpiece spindle 32), to generate a braking torque (S18). With this process, the rotation of the workpiece spindle 32 and the chuck 33 is stopped.

When the spindle motor 30 is braked and the rotation of the chuck 33 is stopped, the control device 34 moves other joints, to attach the workpiece on the chuck 33 (S20). When the attachment of the workpiece is completed (Yes in S22), the connection between the root joint 40 and the spindle motor 30 is released (S24). In other words, the connection gear 54 is moved to release the meshing with the first and second gears 50 and 52. With this process, the workpiece spindle 32 can freely rotate independently from the root joint 40.

The in-machine robot 20 is retracted to a position to not obstruct machining of the workpiece (S26). At this stage, the attachment of the workpiece is already completed, and no heavy object (workpiece) is present on the tip of the in-machine robot 20. Thus, a large torque is not necessary for actuating the root joint 40. Therefore, in this process, the root joint 40 is actuated by the root joint motor 36 having a relatively small power.

As is clear from the above description, in the present configuration, the root joint 40 and the spindle motor 30 are connected to each other only during the period when the in-machine robot 20 retains the workpiece. When the in-machine robot 20 retains the workpiece, a large load is applied to the root joint 40. By connecting the large-power spindle motor 30 to the root joint 40, the output torque of the root joint 40 can be increased. In addition, during the transport of the workpiece (S14), machining or the like is not executed. Thus, there is no problem even if the workpiece spindle 32 rotates in cooperation with the root joint 40. Moreover, during the time of attachment of the workpiece (S20) in which the rotation of the workpiece spindle 32 is stopped, the rotation of the root joint 40 is also stopped. In other words, the period when the workpiece is being transported (S14) and the period when the workpiece is being attached (S20) are both periods in which the cooperative movement of the workpiece spindle 32 and the root joint 40 poses no problem. By connecting the root joint 40 and the spindle motor 30 only during the period when the cooperative operation does not pose any problem, the root joint 40 can be suitably moved without obstructing the machining operation or the like. On the other hand, during a period in which the cooperative operation of the workpiece spindle 32 and the root joint 40 is not possible, the root joint 40 and the spindle motor 30 must be disconnected from each other. As the period in which the cooperative operation is not possible, for example, a period in which the workpiece is being machined corresponds to this period.

In the example configuration of FIG. 3, the root joint 40 and the spindle motor 30 are connected also during the workpiece attachment period (S20) in which the root joint 40 is braked, in order to obtain a sufficient braking torque. However, if a sufficient braking torque can be obtained without the connection, the connection between the root joint 40 and the spindle motor 30 may be released at the time of completion of the workpiece transport. For example, when a brake mechanism or the like for restricting the rotation of the root joint 40 is separately provided, the brake mechanism may be set effective and the connection between the root joint 40 and the spindle motor 30 may be released at the time of completion of the workpiece transport. Further, the load applied to the root joint 40 is large when the in-machine robot 20 is extended in a lengthy manner, but is small when the in-machine robot 20 is folded into a small size. Thus, if the in-machine robot 20 is folded in a small size when the workpiece is transported to the region proximate the chuck 33, it can be said that the load applied to the root joint 40 is small. In this case, the connection between the root joint 40 and the spindle motor 30 may be released at the time of completion of the workpiece transport, and the braking torque may be obtained by the root joint motor 36.

Further, in FIG. 3, an example case is described in which the root joint 40 and the spindle motor 30 are connected to each other when the workpiece is transported and when the workpiece is attached. Alternatively, the root joint 40 and the spindle motor 30 may be connected in other situations, so long as the situation is a situation in which there is no problem even if the root joint and the workpiece spindle 32 operate cooperatively. For example, a machine tool may be considered in which a plurality of types of end effectors 46 are placed outside of the machining chamber, and the in-machine robot 20 exchanges the end effector 46 as necessary. In this case, the in-machine robot 20 must extend the arm in a lengthy manner when the end effector is changed to the end effector 46 provided outside of the machining chamber. In this process, a large load is applied to the root joint 40, and thus, a configuration may be employed in which the root joint 40 and the spindle motor 30 are connected to each other only during a period when the arm is extended in a lengthy manner.

Further, normally, during the period in which the work is being machined, the workpiece spindle 32 is also rotated at a predetermined rotational rate. Thus, the connection between the root joint 40 and the spindle motor 30 is released. In other words, during the period in which the machining using a member (workpiece) retained by the retaining member (workpiece spindle 32) is executed, the connection between the first motor (spindle motor 30) which moves the retaining member and the root joint 40 is released. However, there also exists, among machine tools, a machine tool which has a plurality of workpiece spindles 32. In this case, during a period in which the workpiece retained by one workpiece spindle 32 is machined, the spindle motors 30 corresponding to the other workpiece spindles 32 and the root joint 40 may be connected to each other. In addition, in the descriptions above, a dedicated motor for actuating the root joint 40; that is, the root joint motor 36, is provided, but alternatively, the root joint motor 36 may be omitted in some cases.

Figure 4:
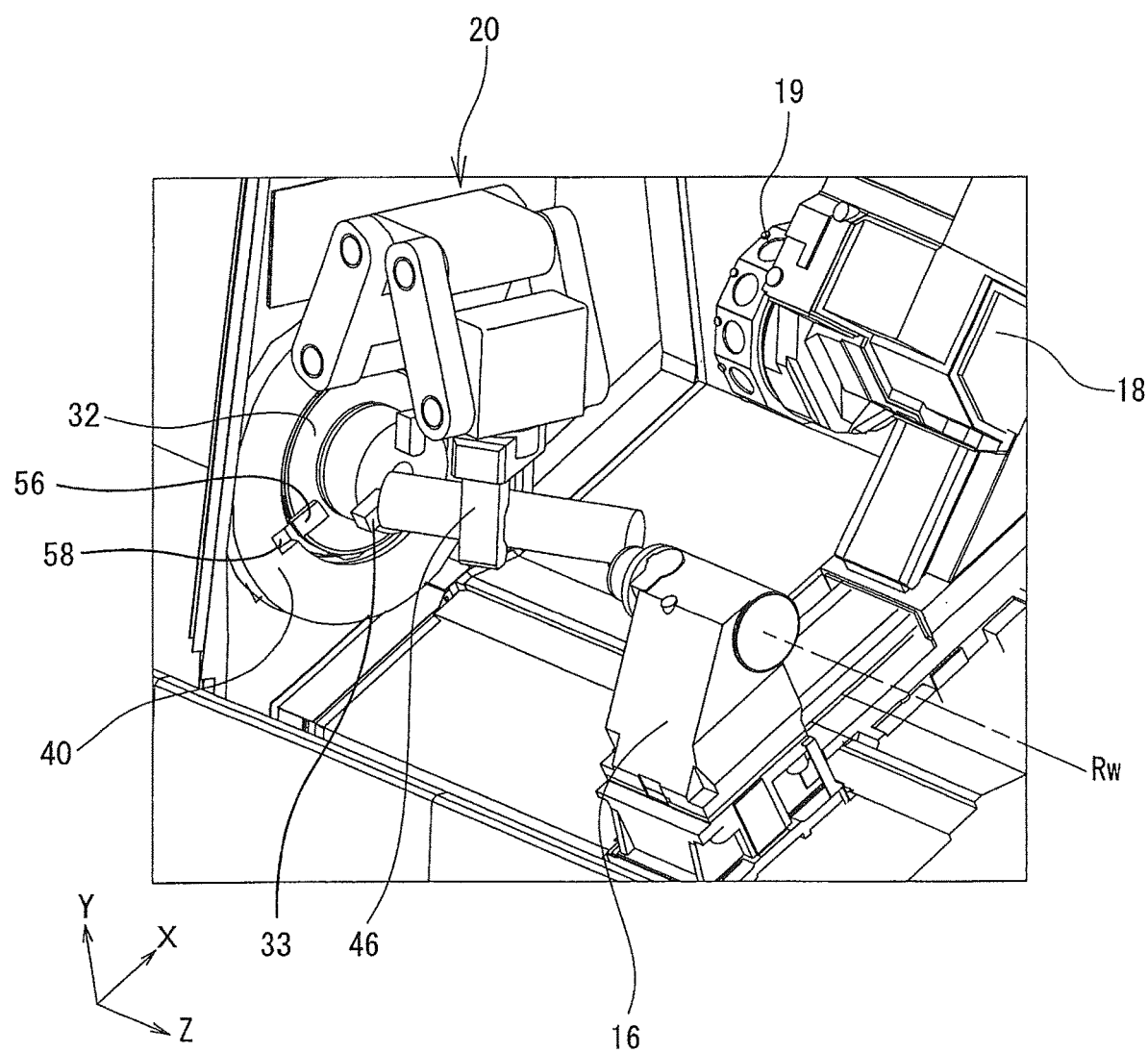
FIG. 4 is a perspective diagram of a region proximate a root joint of another machine tool.
Figure 5:
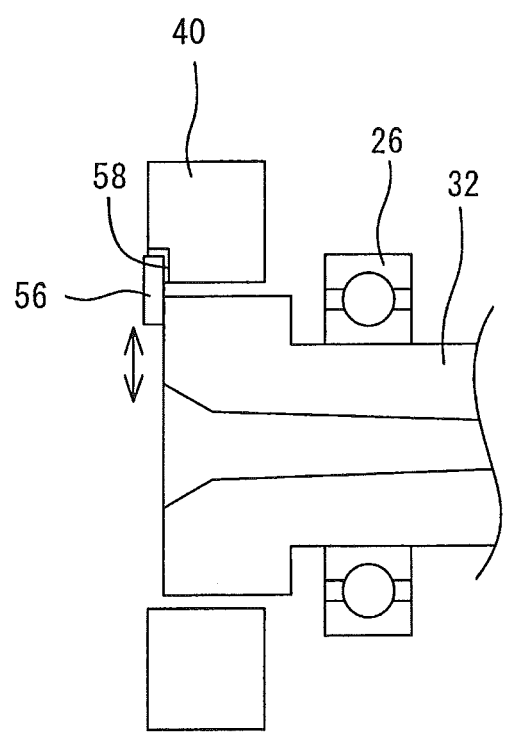
FIG. 5 is a schematic cross-sectional diagram of a region proximate a root joint of another machine tool.

Moreover, in the descriptions above, there is exemplified a case in which the rotational axis Rr of the root joint 40 and the rotational axis Rw of the workpiece spindle 32 do not coincide with each other and are parallel to each other. Alternatively, the rotational axes Rw and Rr may coincide with each other. This configuration will now be described with reference to FIGS. 4 and 5. FIGS. 4 and 5 are diagrams showing an example configuration where the two rotational axes Rr and Rw coincide with each other. In the structure of FIGS. 4 and 5, the root joint 40 is an approximate ring-shaped member placed at an outer periphery of the workpiece spindle 32. The root joint 40 is rotatably attached with respect to the workpiece spindle 32.

On an end surface of the workpiece spindle 32 in the axial direction, an engagement member 56 which moves back and forth in the radial direction is provided. In addition, on the root joint 40, an engagement groove 58 in which a part of the engagement member 56 is stored and to which the engagement member 56 engages is formed. When a large torque is required for actuating the root joint 40, the engagement member 56 provided on the workpiece spindle 32 is moved in an outer side in the radial direction, so that the engagement member 56 engages the engagement groove 58 provided on the root joint 40. With such a configuration, the root joint 40 can rotate in connection with the workpiece spindle 32 by the actuation of a large-power actuation motor. On the other hand, when it is desired to independently move the root joint 40 and the workpiece spindle 32, the engagement member 56 provided on the workpiece spindle 32 is retracted into an inner side in the radial direction, so that the engagement member 56 is disengaged from the engagement groove 58 provided on the root joint 40. With such a configuration, the root joint 40 and the workpiece spindle 32 can move independently from each other. In the exemplified configuration shown in the drawings, the engagement member 56 is provided on the workpiece spindle 32 and the engagement groove 58 is provided on the root joint 40, but alternatively, these members may be provided in a reversed manner. That is, the engagement groove 58 may be provided on the side of the workpiece spindle 32.

Moreover, in the descriptions above, the root joint 40 is connected to the spindle motor 30 which actuates the workpiece spindle 32. Alternatively, the root joint 40 may be connected to other motors, so long as the motor is a motor which rotates or moves the retaining member which retains the tool or the workpiece. For example, the root joint 40 may be suitably connected to or disconnected from a motor for turning the turret 19 (retaining member) which retains the tool. In this case, the in-machine robot 20 is desirably provided on the tool post 18 onto which the turret 19 is attached.

Further, in machine tools called a machining center and a multi-tasking machine having a rotationally cutting function which cuts a workpiece with a rotary tool, a tool spindle device which retains the rotary tool in a rotatable manner, a table on which the workpiece is placed, and the like are provided. In such machine tools, there are some cases where there are provided a rocking motor for rocking the tool spindle device around an axis approximately orthogonal to the tool rotational axis, a table motor for rotating the table, and the like. In this case, the root joint 40 of the in-machine robot 20 may be connected to or disconnected from these motors.

In addition, in the descriptions above, there is described only an example configuration where the root joint 40 is connected to a motor which rotates the retaining member (such as the workpiece spindle 32 and the tool spindle device) which retains the workpiece or the tool. Alternatively, the root joint 40 may be connected to a motor which linearly moves the retaining member. For example, in the case of the machine tool 10 shown in FIG. 1, a Z-axis motor which linearly moves the tool post 18 and the tailstock 16 in the Z direction is built in. The in-machine robot 20 may be placed on a base 22 on which the tool post 18 and the tailstock 16 are placed, and the root joint 40 may be set as a linearly moving joint which linearly moves in the Z direction. The root joint 40 and the Z-axis motor may be connected to or disconnected from each other as necessary.

The invention claimed is:

1. A machine tool comprising:
   a retaining member that retains a workpiece or a tool;
   a first motor that rotates or moves the retaining member;
   an in-machine robot that is provided inside the machine tool and that is an articulated robot having one or more joints; and
   a connection mechanism that connects or disconnects a root joint which is placed, among the one or more joints, closest to a base end, and the first motor to or from each other.

2. The machine tool according to claim 1, further comprising:
   a root joint actuator that is provided separately from the first motor and that actuates the root joint.

3. The machine tool according to claim 2, wherein
   during a period in which the root joint and the first motor are connected to each other, the root joint actuator is set in a free state or is disconnected from the root joint.

4. The machine tool according to claim 1, wherein
   the root joint is a rotary joint that rotates, and
   the retaining member rotates with actuation of the first motor.

5. The machine tool according to claim 4, wherein
   a rotational axis of the retaining member and a rotational axis of the root joint are non-coincident with each other, and
   the root joint is connected to or disconnected from the first motor via a plurality of transmission mechanisms.

6. The machine tool according to claim 4, wherein
   a rotational axis of the retaining member and a rotational axis of the root joint are coincident with each other,
   an engagement element is provided on one of the root joint and the retaining member, and
   an engaged element that engages or disengages in a circumferential direction with or from the engagement element is provided on the other of the root joint and the retaining member.

7. The machine tool according to claim 1, wherein
   the retaining member is a workpiece spindle which retains the workpiece in a self-rotatable manner.

* * * * *